(12) United States Patent
VanNahmen

(10) Patent No.: US 10,926,592 B2
(45) Date of Patent: Feb. 23, 2021

(54) FRONT LOAD TRAILER HITCH CONFIGURATION WITH INTEGRATED FLOOR TILT FRAME

(71) Applicant: Alan G. VanNahmen, Manhattan, KS (US)

(72) Inventor: Alan G. VanNahmen, Manhattan, KS (US)

( * ) Notice: Subject to any disclaimer, the term of this patent is extended or adjusted under 35 U.S.C. 154(b) by 287 days.

(21) Appl. No.: 16/151,112

(22) Filed: Oct. 3, 2018

(65) Prior Publication Data

US 2019/0100063 A1 Apr. 4, 2019

Related U.S. Application Data

(60) Provisional application No. 62/606,657, filed on Oct. 3, 2017.

(51) Int. Cl.
*B60D 1/06* (2006.01)
*B60D 1/167* (2006.01)
*B60D 1/54* (2006.01)

(52) U.S. Cl.
CPC ............ *B60D 1/06* (2013.01); *B60D 1/1675* (2013.01); *B60D 1/54* (2013.01); *B60D 2001/544* (2013.01)

(58) Field of Classification Search
CPC . B60D 1/06; B60D 1/065; B60D 1/14; B60D 1/155; B60D 1/167; B60D 1/1675; B60D 1/54; B60D 2001/544
See application file for complete search history.

(56) References Cited

U.S. PATENT DOCUMENTS

| | | | | |
|---|---|---|---|---|
| 3,740,078 A | * | 6/1973 | Murr | B60D 1/40 280/478.1 |
| 5,188,385 A | * | 2/1993 | Wilson | B60D 1/40 280/477 |
| 6,764,092 B1 | * | 7/2004 | Greaves, Jr. | B60D 1/00 280/402 |
| 6,869,095 B2 | | 3/2005 | Roll et al. | |
| 7,293,791 B1 | * | 11/2007 | Williams, Jr. | B60D 1/00 280/478.1 |
| 7,425,014 B1 | * | 9/2008 | Palmer | B60D 1/06 280/477 |
| 7,976,052 B1 | | 7/2011 | Williams, Jr. | |

(Continued)

*Primary Examiner* — Tony H Winner
*Assistant Examiner* — Maurice L Williams
(74) *Attorney, Agent, or Firm* — Husch Blackwell LLP

(57) ABSTRACT

A hitch assembly that is adapted for allowing the loading and unloading of cargo at the forward end of a trailer. The assembly may comprise a pivot axis, defined by a pivotable connection device, and a first plane, defined by a hitch frame, operably attached to a second plane, defined by a trailer frame of the trailer, by the pivotable connection device. The assembly can be selectively pivoted and secured between at least a first position, a second position, and a third position relative to the trailer frame, wherein the first plane and the second plane may be angularly offset from one another when the assembly is in a position other than the first position. Further, the front end of the trailer frame moves downwardly relative to the coupling means when the hitch assembly is in the second position and upwardly when the hitch assembly is in the third position.

21 Claims, 6 Drawing Sheets

(56) References Cited

U.S. PATENT DOCUMENTS

| | | | | |
|---|---|---|---|---|
| 8,439,388 B1* | 5/2013 | Westervelt | ............ | B60D 1/1675 |
| | | | | 280/494 |
| 8,567,807 B2* | 10/2013 | Su | ........................ | B60D 1/167 |
| | | | | 280/491.3 |
| 8,991,851 B1* | 3/2015 | Kringstad | ................ | B60D 1/01 |
| | | | | 280/504 |
| 10,155,529 B2* | 12/2018 | Bjorkman | ............ | B60D 1/1675 |
| 2019/0263203 A1* | 8/2019 | Perotti | .................... | B60D 1/02 |

* cited by examiner

FRONT LOAD TRAILER HITCH CONFIGURATION WITH INTEGRATED FLOOR TILT FRAME

CROSS-REFERENCE TO RELATED APPLICATIONS

This Application claims priority to U.S. Provisional Patent Application Ser. No. 62/606,657, filed on Oct. 3, 2017, to Alan G. VanNahmen, entitled "Front Load Trailer Hitch Configuration with Integrated Floor Frame Tilt Feature," currently pending, the entire disclosure of which is incorporated herein by reference.

FIELD OF INVENTION

The present invention relates generally to tow hitch apparatuses, and more particularly to a pivotable tow hitch assembly adapted for allowing the loading and unloading of cargo at the front or forward end of a towable trailer.

BACKGROUND OF INVENTION

The transportation of large, bulky, or specialty cargo typically requires the use of trailers that are adapted to be drawn behind a powered towing vehicle. Traditionally, such trailers have included a hitch apparatus or assembly, typically located at or near the front or forward end of the trailer, for detachably coupling the trailer with the towing vehicle. Such hitch apparatuses come in variety of configurations suitable for coupling with different towing vehicles and hauling different types of cargo depending on the circumstances. The coupling means for attaching the trailer via the hitch apparatus to the towing vehicle oftentimes consist of ball and socket hitches, straight tow hitches, gooseneck hitches, pintle hook hitches, fifth wheel hitches or other commercially available coupling means.

The types of cargo traditionally hauled by trailers can include such things as goods, consumer products, vehicles, military equipment, agricultural or construction equipment, baled crops or hay, and livestock, among numerous other things. The traditional attachment location and configuration of a trailer's hitch apparatus relative to the trailer itself typically requires the cargo to be loaded or unloaded at the rear end of the trailer, opposite of the hitch apparatus. One advantage of this rearward loading and unloading method is that it allows for the trailer to remain coupled to the towing vehicle during the loading or unloading process, which generally expedites the transportation process by limiting the amount of time it takes to load or unload the trailer without having to decouple or recouple the trailer to the towing vehicle.

Other circumstances, however, may demand atypical means of loading and unloading a trailer, and such atypical means require the use of specialty trailer apparatuses or ancillary devices and equipment for purposes of loading cargo. Atypical loading and unloading means can include methods of loading and unloading a trailer in a manner other than from the rear of the trailer, including loading and unloading cargo from the front or the sides of the trailer. One problem with these atypical loading means is that since the hitch apparatus is oftentimes located generally at the front or forward end of the towed trailer, the hitch apparatus can interfere with or otherwise frustrate front loading—as well as side loading—which may require moving, displacing, or decoupling or removing the hitch apparatus, or removing other impediments.

For example, atypical loading and unloading means can be facilitated by means that requires a hitch apparatus comprised of a pivotable or "swing away" tongue, which is generally adapted to overcome the structural impediments related to front loading by temporarily moving the components of the hitch apparatus to a less obstructive position. However, such hitch apparatuses do not overcome every obstacle related to atypical loading means, and specifically, a hitch apparatus with a pivotable or "swing away" tongue is generally ill-suited for front loading or unloading cargo from a position that is above or below the cargo-storing plane of the trailer. At the same time, a decouplable gooseneck trailer, which generally further comprises a removable front deck, can allow for cargo situated above or below the cargo-storing plane of the trailer to be loaded or unloaded at the front or forward end of the trailer only by decoupling the hitch apparatus, removing the front deck and lowering the forward end of the trailer to the ground. Further, side loading of a trailer can require such things as ramps, sloped flooring, and loading docks with a terminal loading point at or relatively near the same height as the cargo-storing plane of the trailer, or trailers specifically modified to be better suited for side loading or unloading of cargo, including drop deck or step deck trailers.

These identified atypical loading and unloading means increase the versatility of the trailer by allowing the trailer to be used in a greater number of circumstances, but they are not without their deficiencies that make them time-consuming, cumbersome, and costly. One such problem relates to requisite decoupling of the hitch apparatus from the towing vehicle for purposes of front loading or unloading cargo that is above or below the cargo-storing plane of the trailer, which is time-consuming and, consequently, adversely affects the efficiency of the loading or unloading process. Further, such front loading or unloading devices and methods can also require replaceably removing significant pieces or components of the trailer or hitch apparatus, as best illustrated by decouplable gooseneck trailers, as discussed above.

Another problem relates to the need for additional or specialty equipment to achieve the atypical means of loading or unloading of cargo, which can include portable ramps or specialized flooring and docks capable of conducively adjoining with a trailer and the cargo-storing plane thereof. Such additional equipment does not come without the direct cost of such equipment and potential indirect costs, including, without limitation, the cost associated with hauling the additional equipment from a first loading area to a second loading area instead of the potential, profitable cargo.

Further, another problem relates to the restricting effect that certain modifications to the trailer or equipment can have on the versatility of the trailer to carry different types of cargo under different circumstances. Significant modifications to a trailer or trailer design for a singular, specific purpose, including for atypical loading means, can subsequently limit the potential universe of applications for that trailer, which renders the trailer less valuable or even frustrates the essential purpose of the trailer. Specifically, significant modifications to trailers, for example trailers with drop deck or step deck platforms, can adversely affect the hauling capacity and capabilities of a trailer in a way that makes the trailer less versatile and valuable to the owner or operator.

Accordingly, a need exists for an improved versatile trailer hitching mechanism that is adapted for atypical and front loading or unloading cargo in an efficient and cost-effective manner, including without decoupling from the towing vehicle.

SUMMARY OF THE INVENTION

The present invention is directed generally to apparatuses and assemblies of a pivotable tow hitch adapted for allowing the loading and unloading of cargo at the front or forward end of a towable trailer.

According to one embodiment, the tow hitch assembly may generally comprise a hitch frame operably attached to a trailer frame, wherein the hitch frame generally defines a first plane and comprises a coupling means provided at a distal end of the hitch frame and a pivotal connection device provided at a proximal end of the hitch frame. Further, the pivotable connection device is adapted for selectively pivoting the tow hitch assembly to at least one of a first position, a second position, and a third position relative to the trailer frame, wherein a front end of the trailer frame moves downwardly relative to the coupling means when the hitch assembly is in the second position and upwardly relative to the coupling means when the hitch assembly is in the third position. Further, the tow hitch assembly may comprise a locking device for selectively securing the hitch assembly in at least one of the first position, the second position, and a position between the first position and the second position.

According to one embodiment, the pivotable connection device of the tow hitch assembly may define a pivot axis that is angularly offset from a second plane generally defined by the trailer frame, wherein the pivot axis may be angularly offset from the second plane in at least one of a lateral direction and a longitudinal direction and may be angularly offset by an offset angle of between about 70° and about 87°. Further, the first plane and the second plane may be angularly offset from one another when the hitch assembly is in the second position by between about 3° and about 20°.

According to one embodiment, the pivotable connection device of the tow hitch assembly may comprise a first swivel plate and a second swivel plate axially and pivotably coupled to one another about the pivot axis, wherein the first swivel plate further comprises an outer surface and an angled inner surface and the second swivel plate further comprises an outer surface and an angled inner surface. Further, the angled inner surface of the first swivel plate and the outer surface of the first swivel plate may define a first angle, and the angled inner surface of the second swivel plate and the outer surface of the second swivel plate may define a second angle. Further yet, the first angle may be equal to the second angle and be about between about 3° and about 20°.

According to one embodiment, the tow hitch assembly may be pivotably coupled to a trailer frame of a trailer.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DETAILED DESCRIPTION OF THE INVENTION

Figure 1:
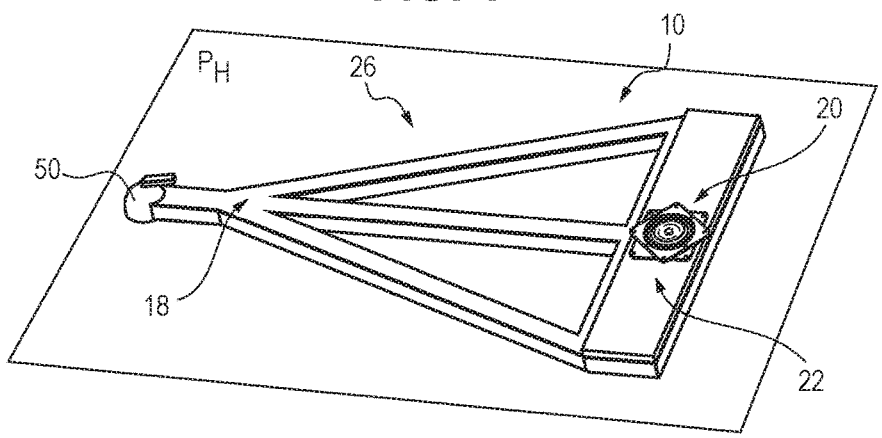
FIG. 1 is a top perspective view of a hitch assembly for use with a trailer in accordance with one embodiment of the present invention.

Various embodiments of the present invention are described and shown in the accompanying drawings. For purposes of clarity in illustrating the characteristics of the present invention, proportional relationships of the elements have not necessarily been maintained in the drawings. It will be appreciated that any dimensions included in the drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One objective of the present invention is to provide a hitch assembly that permits a variety of options for loading and unloading cargo onto a trailer, including, without limitation, front loading or unloading of cargo that is located on the trailer. Another objective of the present invention is to provide a trailer that may be tilted forward and/or backward by rotating the hitch assembly relative to the remainder of the trailer.

One embodiment of the present invention is designed to provide a laterally pivotable hitch assembly that can bias the floor or top surface of a trailer into a sloped orientation, relative to the ground, to a degree proportional to the radial offset related to the laterally pivoting movement. The same embodiment can also include a locking means for securing a pivotable connection device that enables the trailer to be acted upon by the powered vehicle, either drawn or pushed, while also at a selected pivot orientation.

Figure 8:
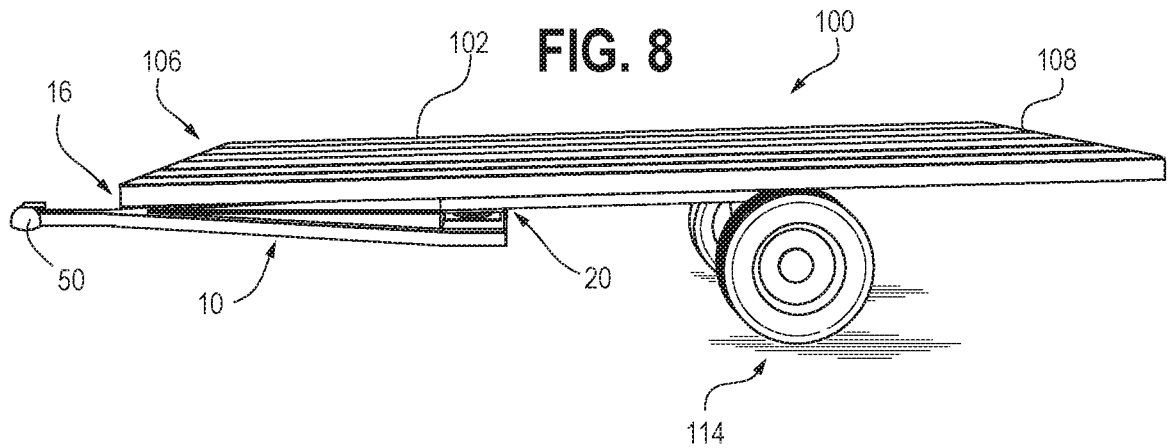
FIG. 8 is a side perspective view of a trailer with a hitch assembly in a first position in accordance with one embodiment of the present invention.
Figure 9:
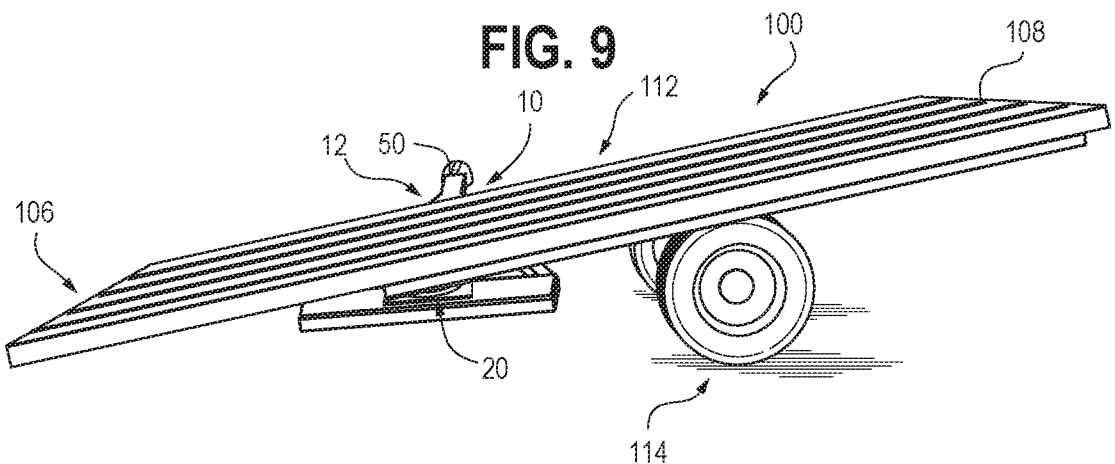
FIG. 9 is a side perspective view of the trailer of FIG. 8 with the hitch assembly in a second position and the trailer floor in a forward sloping orientation.
Figure 10:
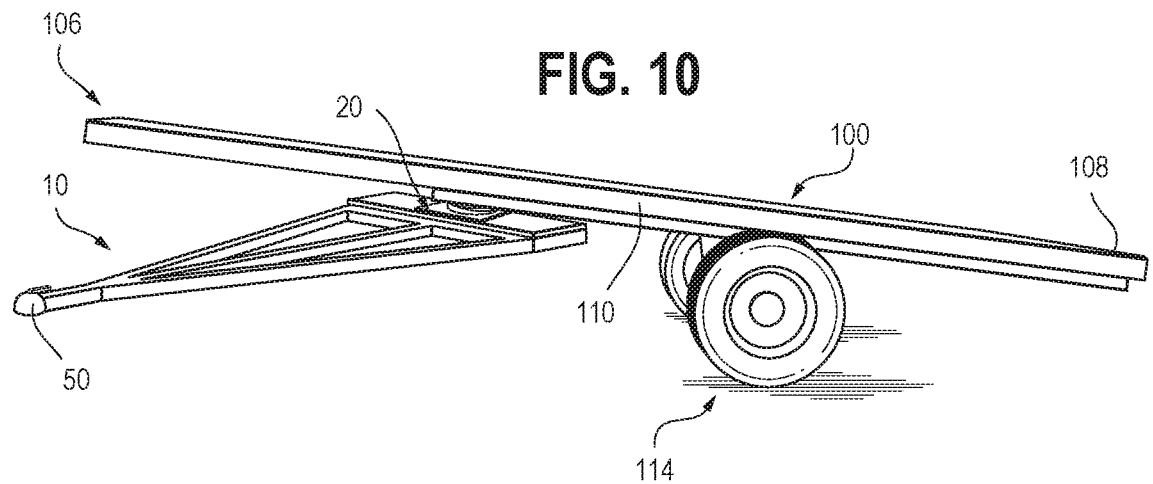
FIG. 10 is a side perspective view of the trailer of FIG. 8 with the hitch assembly in a third position and the trailer floor in a rearward sloping orientation.

The present invention is generally directed to a hitch assembly 10 for a trailer 100 that can be pulled by a towing vehicle 120. As described herein, the hitch assembly 10 generally comprises a pivotable connection device 20 that is fully pivotable between at least one of a first position 16 (where the hitch is in a forwardly extending manner as shown in FIG. 8), a second position 12 (where the hitch is generally on the right or starboard side 112 of the trailer as shown in FIG. 9), and a third position 14 (where the hitch is generally on the left or port side 110 of the trailer as shown in FIG. 10).

As described in greater detail below, according to one embodiment of the present invention, the pivotable connection device 20 can be adapted to achieve a slope in the trailer 100, such that the plane of the trailer's floor or top side 102 is not generally parallel to the ground (i.e., sloped forward or backward) when the hitch assembly 10 is acted upon by the towing vehicle 120. Further, as described in greater detail below, the hitch assembly 10, with the pivotable connection device 20, can further comprise any number of commercially available coupling means 50 for coupling with a towing vehicle 120, including, without limitation, ball and socket hitches, straight tow hitches, gooseneck hitches, pintle hook hitches, fifth wheel hitches, and the like. While the coupling means 50 is shown as a ball and socket hitch in the figures, it will be appreciated that any suitable coupling means can be used.

FIG. 1 depicts a top perspective view of the hitch assembly 10 in accordance with one embodiment of the present invention, wherein the hitch assembly 10 may generally comprise a frame 26, a pivotable connection device 20 at a proximal end 22 of the frame 26, and a coupling means 50 at the distal end 18 of the frame 26. As shown, the members of the frame 26 and hitch assembly 10 generally form or a lie in a first plane $P_H$. While the hitch assembly frame 26 is illustrated in the figures as having an A-frame shape, it will be appreciated that all other suitable frame shapes and configurations are within the scope of the present invention. In one embodiment, the pivotable connection device 20 can generally comprise one or more rotatable swivel plates 30 mounted for pivotable movement about a pivot axis 24. However, it will be appreciated that the pivotable connection device 20 may be adapted for pivoting by any number of known pivoting structures, means, or methods.

Figure 2:
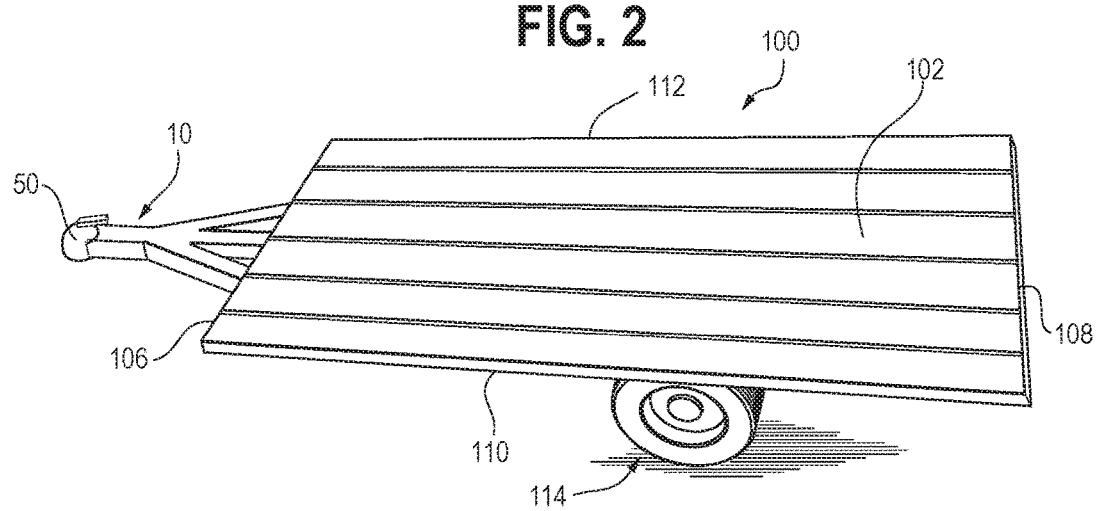
FIG. 2 is a top perspective view of a trailer with a hitch assembly in accordance with one embodiment of the present invention.
Figure 3:
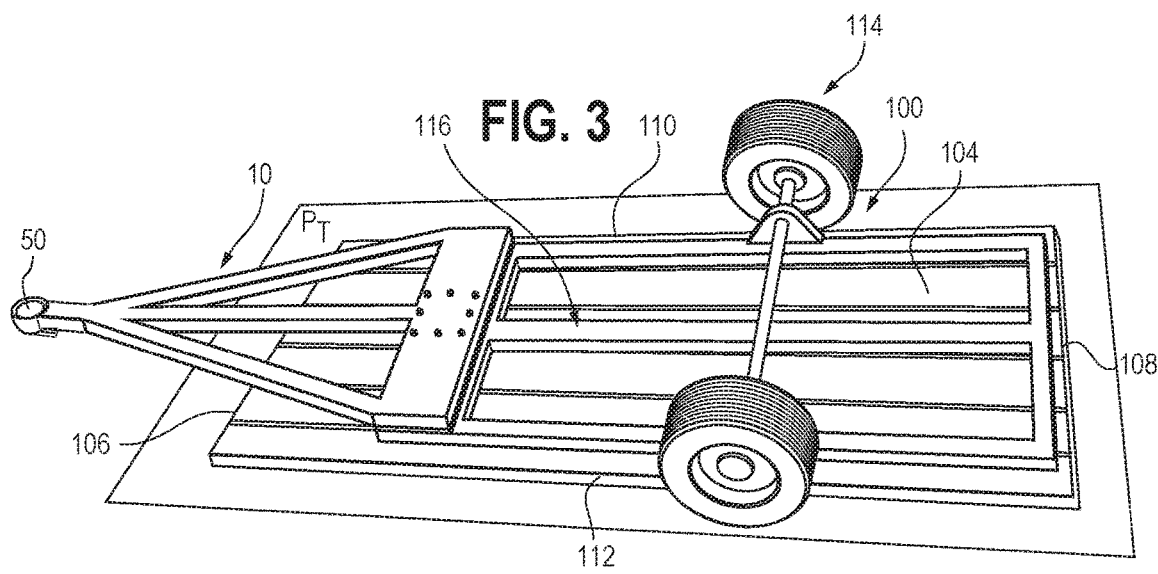
FIG. 3 is a bottom perspective view of a trailer with a hitch assembly in accordance with one embodiment of the present invention.

As best illustrated in FIGS. 2 and 3, the pivotable connection device 20 is mounted or fastened to the trailer 100, which can occur on any surface of the trailer, including, without limitation, the bottom side 104 of the trailer, and be achieved by any number of mounting or fastening means, including, without limitation, through welding, bolts, screws, or any other suitable fastening means. The trailer 100 generally comprises a top side 102, a bottom side 104, a front or bow end 106, a rear or stern end 108, a left or port side 110, a right or starboard side 112, and a wheel assembly 114. Although FIGS. 2 and 3 depict the trailer 100 as a generally rectangular flatbed trailer, it will be appreciated that the present invention can be mounted or fastened to any number of trailers, including, without limitation, livestock trailers, drop deck or step deck trailers, chassis trailers, container trailers, box trailers, dry van trailers, refrigerated trailers, lowboy trailers, expandable flatbed trailers, stretch single drop deck trailers, specialty trailers and any other commercially available trailers. As illustrated in FIG. 3, the top side 102, bottom side 104, frame 116, or one or more of the frame members or components of the trailer 100 generally form or a lie in a second plane $P_T$.

In a preferred embodiment, the pivotable connection device 20 is located near the front end 106 of the trailer 100; however, it will be appreciated that the pivotable connection device 20 may be located at any point along the length of the trailer 100. The pivotable connection device 20 can be attached to the hitch assembly 10 so that the hitch assembly 10 is capable of laterally rotating between the first position 16, second position 12, and the third position 14.

Figure 4:
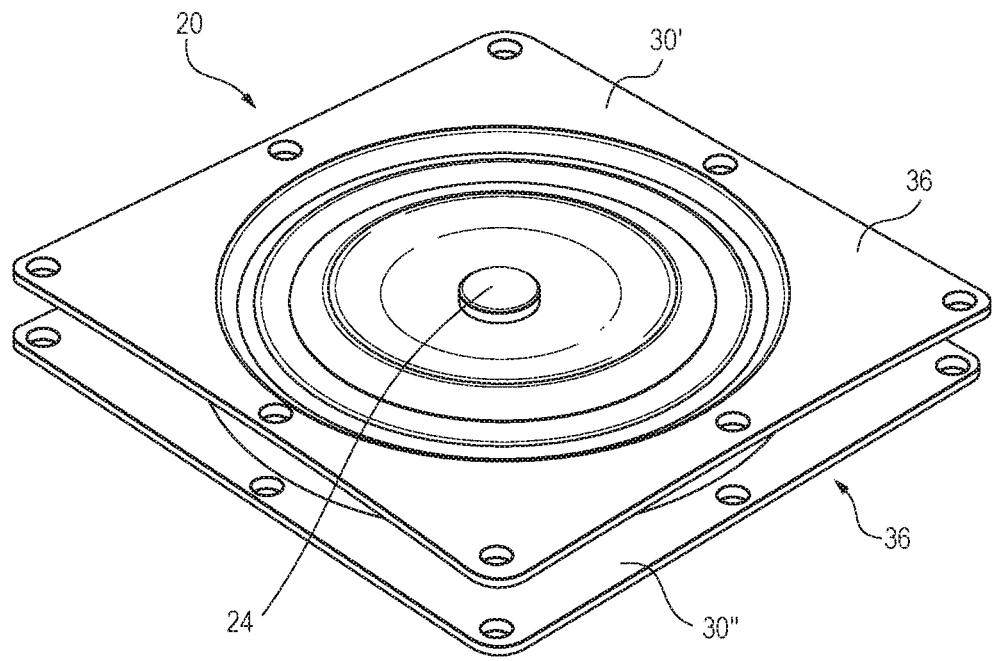
FIG. 4 is a perspective view of a pivotable connection device of a hitch assembly shown in a first orientation in accordance with one embodiment of the present invention.
Figure 5:
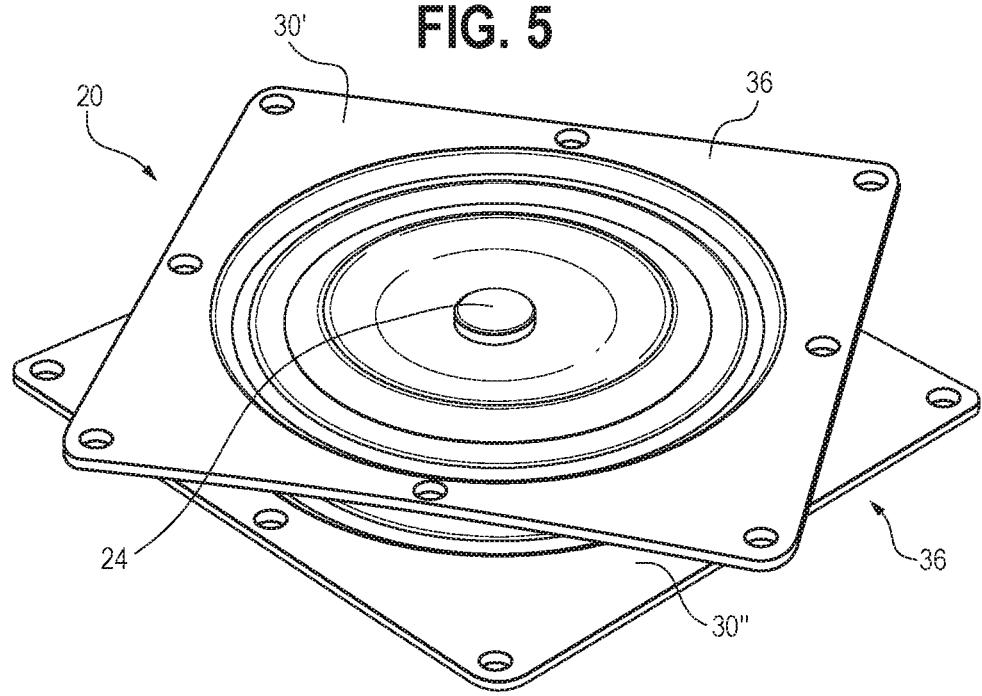
FIG. 5 is a perspective view of the pivotable connection device of FIG. 4 shown in a second orientation.
Figure 6:
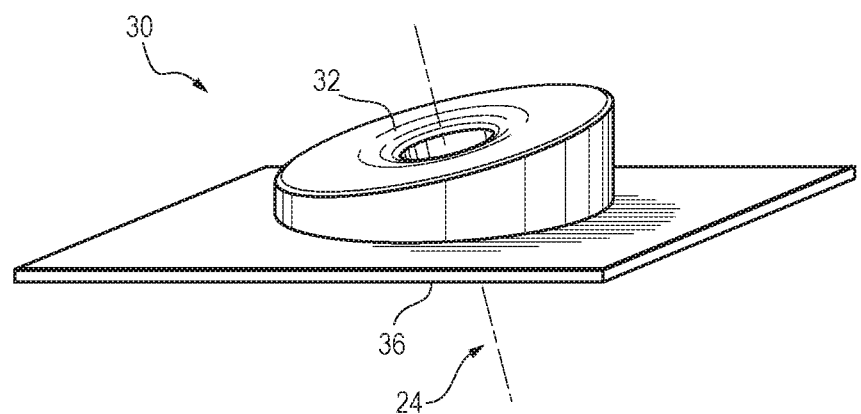
FIG. 6 is a perspective view of a swivel plate of a pivotable connection device of a hitch assembly in accordance with one embodiment of the present invention.
Figure 7:
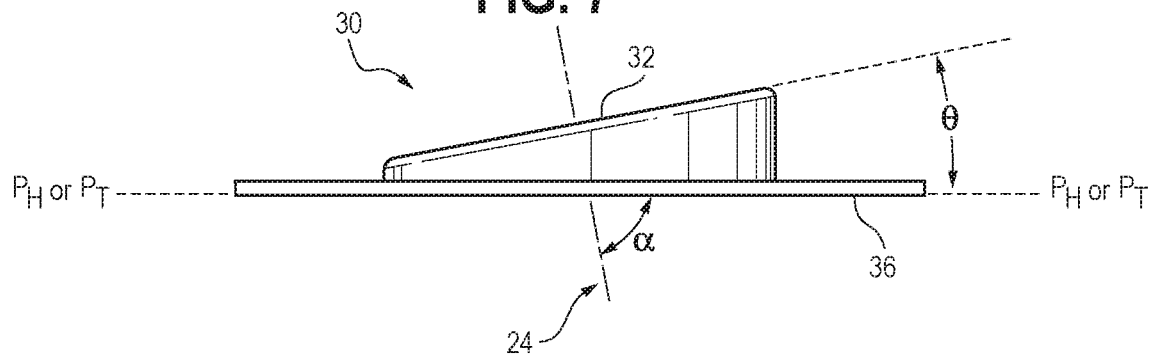
FIG. 7 is a side view of a swivel plate of FIG. 6.

FIGS. 4 and 5 illustrate a perspective view of the pivotable connection device 20 in accordance with one embodiment of the present invention. As best illustrated in FIGS. 4 and 5, the pivotable connection device 20 can comprise a pair of angled swivel plates 30 axially aligned and operably coupled together by a bolt shaft or other connection means about a pivot axis 24. As depicted in FIGS. 6 and 7, each angled swivel plate 30 further generally comprises an inner surface 32 and an outer surface 36. Further, the inner or mating surface 32 and outer surface 36 may define a sloped relationship with an angle θ, in accordance with an embodiment of the present invention. In a preferred embodiment, the upper angled swivel plate 30' is fastened or mounted to the trailer 100, and the lower angled swivel plate 30" is fastened or mounted to the hitch assembly 10. However, it will be appreciated that, in another embodiment, the upper swivel plate 30' can be fastened or mounted to the hitch assembly 10 and the lower swivel plate 30" can be fastened or mounted to the trailer 100. Further, it will be appreciated that the means for mounting or fastening the swivel plates 30 can be any number of mounting or fastening means, including, without limitation, welding or bolts, screws, and other fasteners.

The angle θ formed between the inner surface 32 and the outer surface 36 of the swivel plates 30 is between about 1° and about 30° in one embodiment, between about 3° and about 20° in another embodiment, between about 4° and about 10° in yet another embodiment, and is about 7° in a further embodiment.

As further depicted in FIGS. 6 and 7, the pivot axis 24 can be oriented in a manner such that the pivot axis 24 is angularly offset (i.e., not perpendicular or normal in all directions) relative to the surface of the trailer 100 to which the pivotable connection device 20 is attached, such as the top side 102 or the bottom side 104 of the trailer 100. Further, in accordance with an embodiment of the present invention, the angular offset of the pivot axis 24 relative to the outer surface 36 of the swivel plate 30, which can be attached to the surface of the trailer 100, may define a sloped relationship with an angle α. In those embodiments where the pivotable connection device 20 has a pivot axis 24 that is angularly offset, the angle α formed by the pivot axis 24 relative to the outer surface 36 is between about 60° and about 89° in one embodiment, between about 70° and about 87° in another embodiment, between about 80° and about 86° in yet another embodiment, and is about 83° in a further embodiment.

It will be appreciated that the angle α, as described above, may also be seen as the angle defined between the pivot axis 24 and at least one of the hitch assembly 10 (or plane $P_H$) or the trailer 100 or its frame 116 (or plane $P_T$). In other words, in these embodiments, the pivot axis 24 is not perpendicular to the trailer 100 or its frame 116 (or plane $P_T$) in all directions. Instead, the pivot axis is angularly offset from being perpendicular by an angle α in at least one direction. It will be appreciated that the pivot axis 24 may be angularly offset from the trailer frame 116 (or plane $P_T$) in a lateral direction, a longitudinal direction, or in both lateral and longitude directions. When the pivot axis is angularly offset in a lateral direction (e.g., angled to the left or the right), the plane in which the hitch assembly 10 will sweep as it is rotated will lead to the front end of the trailer 100 being lowered when pivoted in one direction and being raised when pivoted in the opposition direction. When the pivot axis 24 is angularly offset only in a longitudinal direction (e.g., angled to the front or the back), the plane in which the hitch assembly 10 will sweep as it is rotated will lead to the front end of the trailer 100 to be lowered (if offset in a forward direction) or raised (if offset in a rearward direction) irrespective of whether the hitch assembly 10 is pivoted to one direction or the opposition direction.

Figure 11:
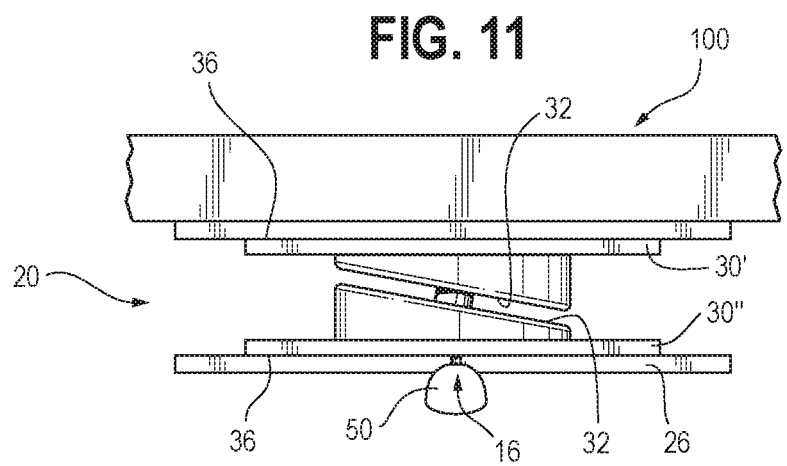
FIG. 11 is a partial front schematic view of a pivotable connection device of a hitch assembly, wherein the hitch assembly is in a first position in accordance with one embodiment of the present invention.

In a preferred embodiment, the angle θ of the slope of the top angled swivel plate 30' is generally the same or equal to angle θ or the slope of the bottom angled swivel plate 30". As best illustrated in FIG. 11, the top angled swivel plate 30' and the bottom angled swivel plate 30" can be aligned such that the respective inner surfaces 32 of the angled swivels plates are generally parallel to each other, in accordance with one embodiment of the present invention. Such arrangement of the swivel plates 30 generally defines a space 34, as best depicted in FIG. 11, that can be generally uniform over the inner surfaces 32 of the angled swivel plates. It will be appreciated that although the defined space 34 between the angled swivel plates 30 may contain bearings or the like, such components are not required. It will further be appreciated that the pivotable connection device 20 may be created by components or structures other than the swivel plates 30. For example, in one embodiment, the pivotable connection device 20 may comprise a slewing ring, a slewing bearing, a rotating collared device, any suitable pivotable or rotatable connection, mechanism, or the like. In fact, any structure that results in mating surfaces 32 or pivot axes 24 that are angularly offset relative to the surface of the trailer 100 to which the pivotable connection device 20 is attached (e.g., mating surfaces 32 that are not parallel with the surface of the trailer 100, a pivot axis 24 that is not perpendicular or normal to the surface of the trailer 100, and so on), regardless of how such structure is formed, is within the scope of the present invention.

As illustrated in FIGS. 8-10, when the hitch assembly 10 is laterally pivoted or rotated about the pivot axis 24 of the pivotable connection device 20, the arrangement of the angled swivel plates 30 and the pivot axis 24 of the pivotable connection device 20 can render a sloped relationship between the hitch assembly 10 and the trailer 100. For example, in one embodiment, pivoting the hitch assembly 10 toward the second position 12 can cause the front end 106 of the trailer to slope down toward the ground, as depicted in FIG. 9. In this position, objects may be loaded or unloaded from the front end 106 of the trailer, which may be adjacent to or near the ground. Similarly, pivoting the hitch assembly 10 toward the third position 14 can cause the front end 106 of the trailer to slope up away from the ground and the rear end 108 to slope down toward the ground, as depicted in FIG. 10. In this position, objects may be loaded or unloaded from the rear end 108 of the trailer, which may be adjacent to or near the ground. Due to the angle α defined by the pivot axis 24, when rotated, the hitch assembly 10 may sweep a path along a plane $P_H$ that is angularly offset from a plane $P_T$ of the trailer 100. Thus, the front end of the floor or top side 102 of the trailer 100 will move either downwardly (see FIG. 9) or upwardly (see FIG. 10) relative to the coupling means 50 of the hitch assembly 10, depending upon which direction the hitch assembly is rotated.

It will be appreciated that the wheel assembly 114 may be located at any point along the length of the trailer 100 to facilitate the desired upward or downward slope of the front end 106 or the rear end 108 of the trailer 100 relative to the ground. Finally, placing hitch assembly 10 in the first position 16 can cause the floor or top side 102 of the trailer to be generally parallel to the ground, as depicted in FIG. 8.

Figure 12:
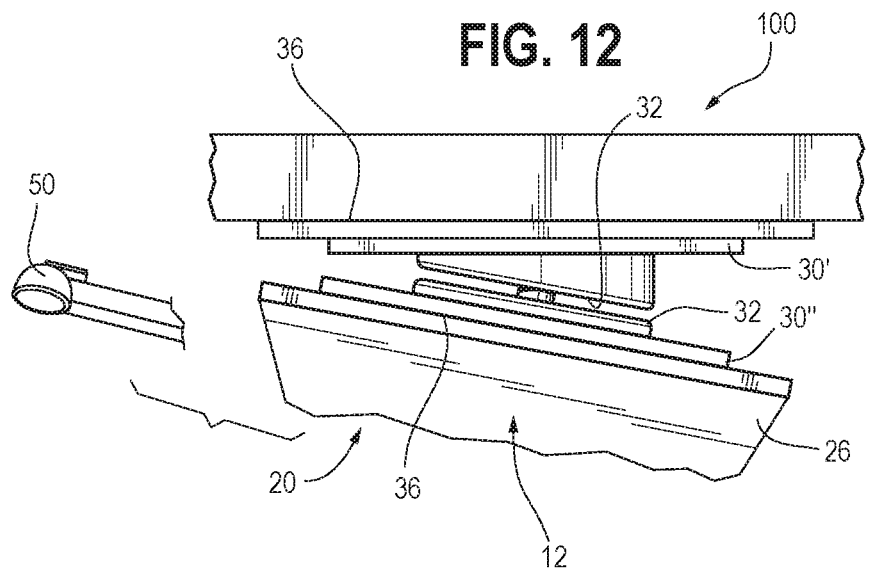
FIG. 12 is a partial front schematic view of the pivotable connection device of FIG. 11, wherein the hitch assembly is in a second position.
Figure 13:
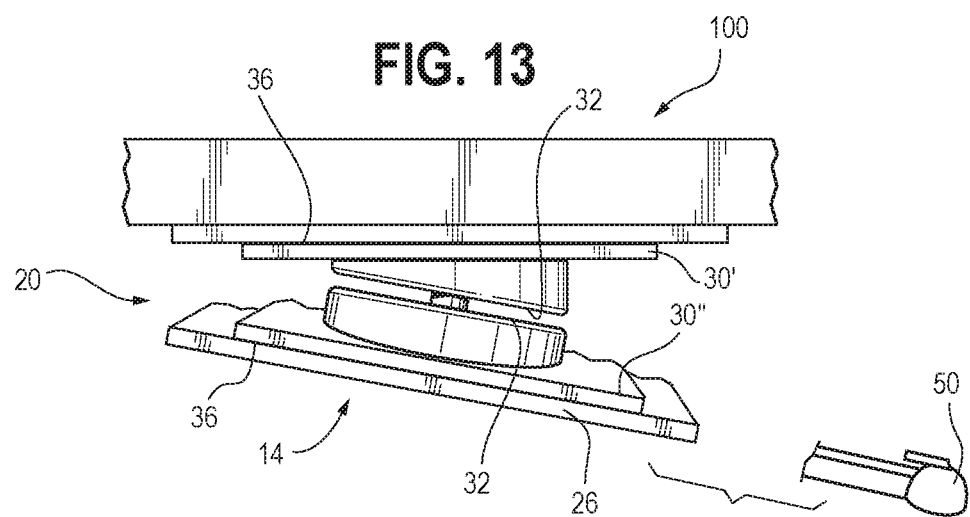
FIG. 13 is a partial front schematic view of the pivotable connection device of FIG. 11, wherein the hitch assembly is in a third position.

FIGS. 11-13 depict partial front schematic views of the angled swivel plates 30 and the arrangement thereof, when viewed from the front or bow end 106 of the trailer 100, when the hitch assembly 10 is in the first position 16, the second position 12, and the third position 14. In one embodiment, the arrangements of the angled swivel plates 30 can affect the slope of the trailer 100.

For example, when the hitch assembly 10 is in the first position 16, the respective inner surfaces 32 of the angled swivel plates remain in a parallel relationship and the respective outer surfaces 36 of the angled swivel plates are also in a parallel relationship, as depicted in FIG. 11. In this first position 16, the frame 26 of the hitch is generally parallel with the floor or top side 102 of the trailer 100 (i.e., plane $P_H$ is generally parallel with plane $P_T$).

However, when the hitch assembly 10 is in the second position 12, the inner surfaces 32 and the pivot axis 24 interact in a manner that causes the respective outer surfaces 36 of the angled swivel plates to become non-parallel and renders a sloped relationship between the outer surfaces 36, as depicted in FIG. 12. In this second position 12, the frame 26 of the hitch is generally angled relative to the floor or top side 102 of the trailer 100 such that the front end 106 is moved downwardly toward the ground (i.e., plane $P_T$ slopes downwardly relative to plane $P_H$).

Similarly, when the hitch assembly 10 is in the third position 14, the inner surfaces 32 interact in a manner that causes the respective outer surfaces 36 of the angled swivel plates to become non-parallel and renders a sloped relationship between the outer surfaces 36, as depicted in FIG. 13. In this third position 14, the frame of the hitch is generally angled relative to the floor or top side 102 of the trailer 100 such that the rear end 108 is moved downwardly toward the ground (i.e., plane $P_T$ slopes upwardly relative to plane $P_H$).

In accordance with one embodiment, the hitch assembly 10 can be pivoted between the second position 12 and the third position 14, creating either an upward or downward slope in the trailer 100 relative to the ground. The hitch assembly 10 can be moved or pivoted between the various positions by any number of means, including, without limitation, manually, by a motor, by a crank, or by the force exerted by the towing vehicle 120 acting upon the coupling means 50 attached to the distal end 18 of the hitch assembly 10. It will be appreciated that the desired slope of the trailer can be achieved for purposes of loading or unloading the trailer 100 without uncoupling the hitch assembly 10 from the towing vehicle 120.

Further, in accordance with one embodiment of the present invention, the pivotable connection device 20 can comprise a locking means for selectively securing the pivotable connection device 20 at any orientation or location on or between the first position 16, the second position 12 and the third position 14. The locking means can be adapted for retaining the selected orientation for the pivotable connection device 20 even when the hitch assembly 10 is acted upon, whether by the towing vehicle 120 or otherwise. In a preferred embodiment, by retaining the orientation of the pivotable connection device 20 even when the hitch assembly 10 is acted upon, the trailer 100 can be drawn or pushed while simultaneously maintaining its position relative to the vehicle exerting the driving forces. Further, in an additional embodiment, by retaining the orientation of the pivotable connection device 20 even when the hitch assembly 10 is acted upon, the trailer 100 can be drawn or pushed while simultaneously maintaining the sloped angle of the trailer 100 rendered by the position of the hitch assembly 10 relative to the second position 12 or the third position 14. For example, by using the locking means to secure the pivotable connection device 20 in a way that the hitch assembly 10 is positioned generally toward the second position 12 can allow the trailer 100 to be drawn or pushed while the front end 106 of the trailer is sloped down toward the ground, in a manner similar to what is depicted in FIG. 9.

Figure 14:
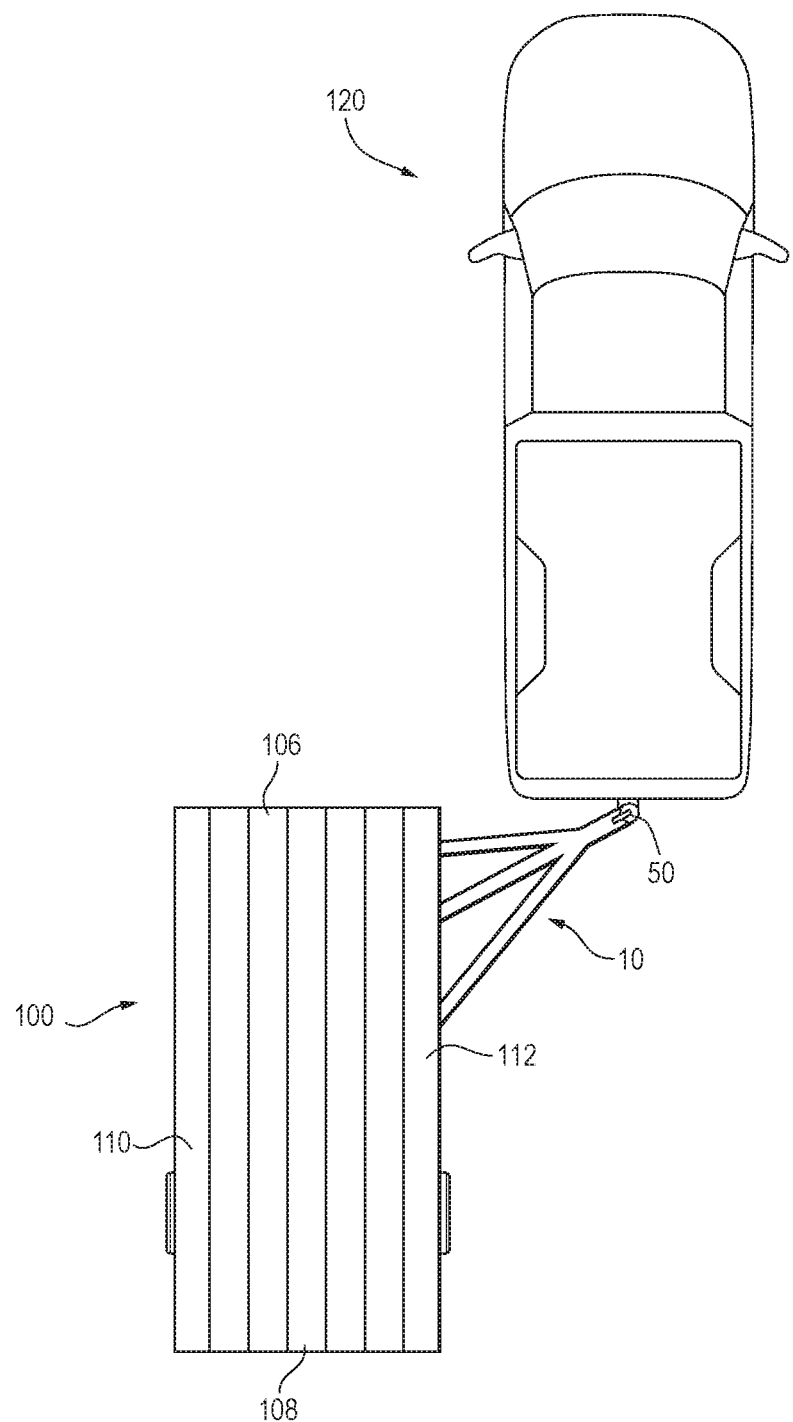
FIG. 14 is a top view of the trailer with the hitch assembly in a second position and being pulled by a towing vehicle in accordance with one embodiment of the present invention.

In such an embodiment, the trailer 100 and towing vehicle 120 are longitudinally offset from one another, whereby the towing vehicle 120 is located to one side or the other relative to the trailer 100, as demonstrated in FIG. 14. This permits the trailer 100 to be used in applications whereby objects or cargo can be loaded or unloaded from the trailer 100 without the towing vehicle 120 interfering. This also permits the trailer 100 to be used in applications whereby objects or cargo can be loaded while the towing vehicle 120 is driven, such as for loading baled hay or the like. While the towing vehicle 120 is shown as being located to the right side 112 of the trailer 100 in FIG. 14, it will further be appreciated that the angle(s) of the pivotable connection device 20 may be modified or reversed in some embodiments such that the towing vehicle 120 may be located to the left side 110 of the trailer 100.

From the accompanying materials, it will be seen that the invention is one well adapted to attain all the ends and objects set forth herein with other advantages which are obvious and which are inherent to the structure. It will be understood that certain features and subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described in the accompanying materials and illustrated in the drawings are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A hitch assembly comprising:
a hitch frame generally defining a first plane;
a coupling means provided at a distal end of the hitch frame;
a pivotable connection device provided at a proximal end of the hitch frame, wherein the pivotable connection device is adapted for selectively pivoting the hitch assembly relative to a trailer frame to which the hitch assembly is adapted for being operably attached; and
a pivot axis defined by the pivotable connection device, wherein the pivot axis is angularly offset from a second plane generally defined by the trailer frame;
wherein the hitch assembly is pivotable between a first position and a second position relative to the trailer frame;
wherein a front end of the trailer frame moves downwardly relative to the coupling means when the hitch assembly is in the second position.

2. The hitch assembly of claim 1, wherein the pivot axis is angularly offset from the second plane in at least one of a lateral direction and a longitudinal direction.

3. The hitch assembly of claim 1, wherein the pivot axis is angularly offset from the second plane by an offset angle of between about 70° and about 87°.

4. The hitch assembly of claim 1, wherein the first plane and the second plane are angularly offset from one another when the hitch assembly is in the second position.

5. The hitch assembly of claim 1, wherein the first plane and the second plane become angularly offset from one another by between about 3° and about 20° when the hitch assembly is in the second position.

6. The hitch assembly of claim 1, wherein the hitch assembly is further pivotable to a third position relative to the trailer frame.

7. The hitch assembly of claim 6, wherein a front end of the trailer frame moves upwardly relative to the coupling means when the hitch assembly is in the third position.

8. The hitch assembly of claim 1 further comprising a locking device for selectively securing the hitch assembly in at least one of the first position, the second position, and a position between the first position and the second position.

9. The hitch assembly of claim 1, wherein the pivotable connection device comprises a first swivel plate and a second swivel plate axially and pivotably coupled to one another about the pivot axis.

10. The hitch assembly of claim 9, wherein:
the first swivel plate further comprises an outer surface and an angled inner surface; and
the angled inner surface of the first swivel plate and the outer surface of the first swivel plate define a first angle.

11. The hitch assembly of claim 10, wherein:
the second swivel plate further comprises an outer surface and an angled inner surface; and
the angled inner surface of the second swivel plate and the outer surface of the second swivel plate define a second angle.

12. The hitch assembly of claim 11, wherein the first angle is equal to the second angle.

13. The hitch assembly of claim 12, wherein the first angle is equal to the second angle and are each between about 3° and about 20°.

14. A trailer comprising:
a trailer frame; and
a hitch assembly pivotably coupled to the trailer frame, the hitch assembly comprising:

a hitch frame generally defining a first plane;

a coupling means provided at a distal end of the hitch frame;

a pivotable connection device provided at a proximal end of the hitch frame, wherein the pivotable connection device is adapted for selectively pivoting the hitch assembly relative to the trailer frame; and a pivot axis defined by the pivotable connection device, wherein the pivot axis is angularly offset from a second plane generally defined by the trailer frame;

wherein the hitch assembly is pivotable between a first position and a second position relative to the trailer frame;

wherein a front end of the trailer frame moves downwardly relative to the coupling means when the hitch assembly is in the second position.

15. The trailer of claim 14, wherein the pivot axis is angularly offset from the second plane in at least one of a lateral direction and a longitudinal direction.

16. The trailer of claim 14, wherein the pivot axis is angularly offset from the second plane by an offset angle of between about 70° and about 87°.

17. The trailer of claim 14 wherein the first plane and the second plane are angularly offset from one another when the hitch assembly is in the second position.

18. The trailer of claim 14 wherein the first plane and the second plane become angularly offset from one another by between about 3° and about 20° when the hitch assembly is in the second position.

19. The trailer of claim 14 wherein the hitch assembly is further pivotable to a third position relative to the trailer frame.

20. The trailer of claim 14 further comprising a locking device for selectively securing the hitch assembly in at least one of the first position, the second position, and a position between the first position and the second position.

21. A trailer comprising:

a trailer frame; and a hitch assembly pivotably coupled to the trailer frame, the hitch assembly comprising:

a hitch frame generally defining a first plane;

a coupling means provided at a distal end of the hitch frame;

a pivotable connection device provided at a proximal end of the hitch frame, wherein the pivotable connection device is adapted for selectively pivoting the hitch assembly relative to the trailer frame; and a pivot axis defined by the pivotable connection device, wherein the pivot axis is angularly offset from a second plane generally defined by the trailer frame;

wherein the hitch assembly is pivotable between a first position, a second position, and a third position relative to the trailer frame;

wherein a front end of the trailer frame moves upwardly relative to the coupling means when the hitch assembly is in the third position.

* * * * *